June 12, 1962 J. H. BROWN 3,039,008
MAGNETIC CORE AMPLIFYING CIRCUIT
Filed June 23, 1958 2 Sheets-Sheet 1

J. HERBERT BROWN
INVENTOR.
BY HIS ATTORNEYS,
HARRIS, KIECH, FOSTER & HARRIS

June 12, 1962 J. H. BROWN 3,039,008

MAGNETIC CORE AMPLIFYING CIRCUIT

Filed June 23, 1958 2 Sheets-Sheet 2

J. HERBERT BROWN
INVENTOR.
BY HIS ATTORNEYS
HARRIS, KIECH, FOSTER & HARRIS

United States Patent Office 3,039,008

Patented June 12, 1962

3,039,008

MAGNETIC CORE AMPLIFYING CIRCUIT

J. Herbert Brown, La Habra Heights, Calif., assignor to Beckman Instruments, Inc., a corporation of California Filed June 23, 1958, Ser. No. 743,787

13 Claims. (Cl. 307—88)

This invention relates to magnetic core amplifying circuits and, more particularly, to amplifying circuits suitable for use in digital systems, such as data handling systems, digital control devices, computers and the like. The basic purpose of amplifiers of this type is to provide an unambiguous correlation between an input signal or signals usually of relatively low energy and an output signal of relatively high energy.

In many applications of these amplifiers, the input signals will deviate in magnitude, wave form, timing and in other characteristics from the nominal or ideal characteristics of input signals. Such deviations may be present because of side effects that usually occur to a signal when it traverses preceding parts of a system such as diode logic circuits and may also be produced by imperfections in output characteristics of preceding amplifiers. It is an object of the invention to provide amplifying circuits that produce output signals having closely defined characteristics irrespective of deviations of the input signals from the nominal.

The possibility of errors occurring in a system due to such deviations in input signals increases greatly as the number of operating stages in the system increases, since the effects of the deviations are ordinarily cumulative. Accordingly, it is an object of the invention to provide amplifying circuits which have closely controlled outputs including magnitude, wave form and timing, which circuits can be used throughout a system to prevent accumulation of error.

One of the undesirable side effects in a signal is input pulse delay. For example, consider two signals which pass through a system with one undergoing several more operations than the other. When the two signals are coupled to an and circuit, the delay in the one relative to the other may be of a magnitude to prevent coincidence of the signals at the and circuit, resulting in erroneous output from the system.

Spurious signals, which may be defined as voltage disturbances similar to true or standard signals but of short duration in comparison to true signals, may cause erroneous results in systems which have no way to automatically reject such disturbances. Spurious signals can especially endanger correct operation of a system which contains elements such as amplifiers that will effect a change in spurious signals to make them more resemble a true signal after being operated on by the element. Errors due to input signal delay and spurious signals are more likely to occur when the repetition rate of signal pulses is high and the energy per pulse is low. Of course, a high repetition rate and low energy per pulse are desirable features in any system seeking to perform operations on or with a minimum of operational data and with a minimum of components and at relatively low cost.

It is an object of the invention to provide an amplifier which generates outputs of substantially constant duration and magnitude in close timed relation to a nonsignal carrying repetitive control, magnitude and timing. A further object of the invention is to provide saturable core amplifying circuits that reject substantially all spurious signals so that the circuit output is the same as would have been produced were the spurious signals absent.

It is an object of the invention to provide a saturable core amplifier circuit which generates an output during a second period in response to an input received during a preceding first period with the circuit being nonresponsive to inputs during the second period and producing no changes in output during the first period, wherein the flux condition of the saturable core is controlled by cyclically changing voltage sources coupled to core windings, with the input responsive period and the output generating period being related to the cyclic changes, and wherein the output generating period terminates before the input responsive period starts. Another object is to provide such a circuit wherein the cyclic changing voltage sources provide for changing of the output from the output generating condition to non-generating condition in steps with a neutral period intervening.

It is an object of the invention to provide such amplifying circuits which may be controlled by either of two sets of cyclically changing voltage sources which are out of phase with each other so that a plurality of the amplifiers may be operated in series with the output of one amplifier serving as the input for the next succeeding amplifier and with the alternate amplifiers being controlled by the alternate phases of the voltage sources.

In brief, the invention utilizes an amplifier circuit utilizing a saturable magnetic core with an input or reset winding and an output or gate winding with the magnetizing forces produced by the windings and hence the flux condition of the core being cyclically changed by reset voltage and gate voltage sources coupled thereto. The timing of the variations of the voltage sources is selected so that particular inputs occurring at predetermined time intervals produce predetermined outputs at other time intervals.

The invention also comprises novel details in the combinations and arrangements of parts as well as other objects, advantages, features and results which will more fully appear in the course of the following description. The drawings merely show and the description merely describes preferred embodiments of the present invention which are given by way of illustration or example.

Figures 1, 2:
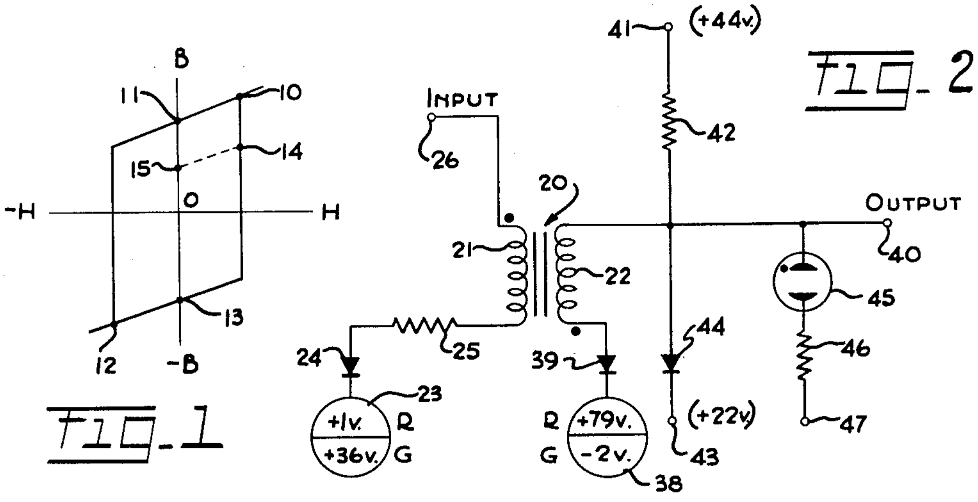
FIG. 1 is a hysteresis curve of a magnetic material suitable for use in the amplifier in the invention.
FIG. 2 is a schematic of a preferred embodiment of the invention showing a non-inverting amplifier.

FIG. 1 is a diagrammatic representation of the relationship between magnetomotive force H and the flux condition B of a core made of magnetic material with a so-called square hysteresis loop. When the magnetic pattern of the core material is at random orientation and no initial magnetomotive force is applied to the core, the core condition is represented by the intersection O of the axes. On application of a positive magnetomotive force, the core flux increases toward a point 10 and further increase in the magnetomotive force in a positive direction does not materially increase the magnetic flux of the core, the core being saturated. If the magnetomotive force is reduced to zero while the core is saturated, almost all of the flux remains in the core, the core remaining saturated in a condition represented by the point 11. Flux of the opposite sign is induced in the core by applying a magnetomotive force of the opposite sense, causing saturation of the core with the condition represented by the point 12. On removal of the magnetomotive force, the flux in the core will drop slightly to the condition at the point 13.

If desired, less than full saturation of either polarity can be obtained by applying the magnetizing force for a shorter interval of time. With the core in the condition as represented by point 13, a precisely controlled number of volt-seconds per turn applied to the core could raise the flux density up to point 14 only. With the removal of magnetomotive force at this time, remanent flux would then stabilize at point 15. If the core were then driven by another pulse of the same polarity, the core would become fully saturated to the condition of point 11. If the next pulse were of the opposite polarity, the core would be driven to the opposite flux condition toward the point 13.

The magnetomotive force is ordinarily applied by current in a winding around the core. During change in flux condition in the core, a counter E.M.F. opposes any current in the winding, thus giving the winding a high impedance. However, when the core reaches saturation, flux change ceases and the counter E.M.F. disappears, resulting in a drop in impedance of the winding to approximately the resistance of the wire comprising the winding. This characteristic of saturable core windings is used in the amplifier circuits of the invention. In subsequent discussions of the core, the two saturation conditions will be referred to as gate saturation and reset saturation. While the invention is discussed herein in connection with magnetic material having a "square" hysteresis loop, it is understood that a square loop is the ideal situation and that the invention will work with core material which is less than ideal.

The amplifier of FIG. 2 includes a magnetic core 20 having an input of reset winding 21 and an output or gate winding 22 thereon. The core 20 is ordinarily toroid in form and preferably consists of material having a near square hysteresis characteristic. A reset voltage source 23 is connected to one terminal of the reset winding through a rectifier 24 and a current limiting resistor 25, the other terminal of the reset winding being an input terminal 26. The rectifier 24 is polarized to permit only that current in the reset winding 21 which tends to change the flux condition of the core 20 toward the reset saturation condition.

In the embodiments of the invention illustrated herein, specific values of voltage are given for the various voltage sources. These voltage values are provided as illustrative of the mode of operation of the amplifier circuits and are not intended as limitations. Various other voltage values may be used, so long as the operating conditions described herein are met.

A gate voltage source 38 is connected to one terminal of the gate winding 22 through a rectifier 39, which rectifier is polarized to permit only that current in the gate winding 22 which tends to change the flux condition of the core towards gate saturation. The other terminal of the gate winding is connected to an output terminal 40, which output terminal is connected to an output voltage source 41 through a resistor 42 and to a clamp voltage 43 through a rectifier 44. A neon lamp 45 and resistor 46 may be serially connected between the output terminal 40 and a voltage source 47 to provide a visual indication of the voltage condition of the output terminal.

Figure 3:
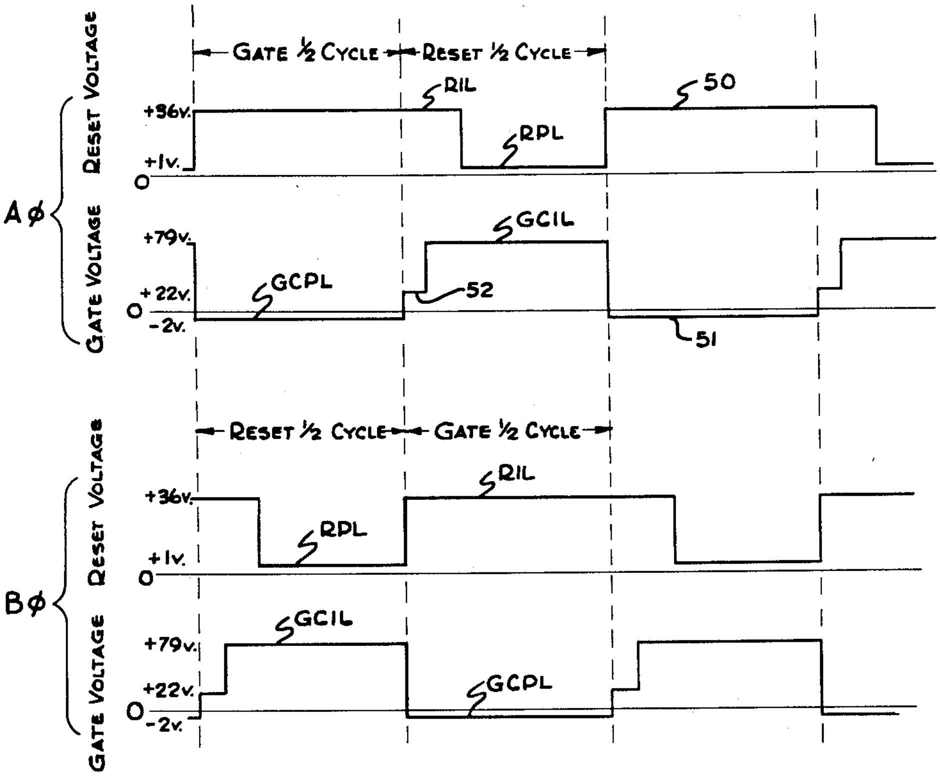
FIG. 3 is a graph of voltage wave forms for use with circuit of FIG. 2.

In the operation of the amplifier of FIG. 2, the reset voltage source 23 is cyclically switched from plus 1 volt to plus 36 volts and returned, the plus 1 volt being known as the reset permit level and the plus 36 volts as the reset inhibit level. Similarly, the gate voltage source 38 is cyclically switched between plus 79 volts, known as the gate current inhibit level, and minus 2 volts, known as the gate current permit level. This repetitive voltage level switching is divided into two portions, referred to as the gate half cycle and the reset half cycle which are ordinarily, but not necessarily, equal in duration. During the gate half cycle, the reset voltage source is at the reset inhibit level and the gate voltage source is at the gate current permit level while during the reset half cycle, the reset voltage source is primarily at the reset permit level and the gate voltage source at the gate current inhibit level. These voltage level and time relations are shown in FIG. 3, wherein curve 50 represents the reset voltage source levels and curve 51 represents the gate voltage source levels. The significance of the A and B phase curves will be discussed below. The amplifier is intended for use in digital operations and, in this particular embodiment, the input signals will either be a 1 or a 0, where 1 is in the order of plus 22 volts and 0 is in the order of zero volts.

During the gate half cycle, the reset voltage source 23 is at the reset inhibit level, plus 36 volts, and neither a 1 nor a 0 at the input terminal 26 will produce any current in the reset winding 21. During this portion of the repetitive cycle, no voltage appearing at input terminal 26 less than about twenty-five volts will affect the flux condition of the core. Also, the reset inhibit level, plus 36 volts, will effectively block the voltage generated across the reset winding during the time that gate current flows in the gate winding.

When the reset voltage source changes to the reset permit level, plus 1 volt, a 1 input signal at terminal 26 will provide volt-seconds per turn in the reset winding 21 of sufficient magnitude to change the core flux from gate saturation to reset saturation. The core 20 and winding 21 are preferably designed so that the 1 signal must exist at the input terminal 26 for the entire latter two-thirds of the reset half cycle in order to substantially complete the flux change from gate saturation to reset saturation. This feature prevents short duration spurious signals from producing reset saturation. If a 0 input signal is maintained at the input terminal 26 during the reset half cycle, there will be no current in the reset winding and no change in flux condition.

The voltage levels of the reset voltage source are selected so that the possible input voltages will be less than the reset inhibit level, and the 0 input voltage will be substantially the same as the reset permit level, the plus 1 volt being provided to compensate for drop in as many as three series-connected rectifiers 24.

Referring now to the gate winding and the output side of the amplifier circuit, the clamp circuit including the voltage source 43 and the rectifier 44 prevents the voltage at the output terminal 40 from exceeding a predetermined value, here 22 volts, which corresponds to a 1 output signal. When the core 20 is at less than gate saturation, the impedance of the gate winding 22 will be high and the winding will have substantially no effect on the voltage at the output terminal. However, when the core is at gate saturation, the impedance of the gate winding 22 will be very low and the effect of this low impedance on the output voltage will depend upon the level of the gate voltage source 38.

When the gate voltage source is at gate current inhibit level, plus 79 volts, there will be negligible current in the gate winding 22, and negligible change in flux condition of the core will be caused by the output side of the circuit. The relatively high value of 79 volts is necessary because of the turns ratio of the amplifier. When a reset voltage is present, a relatively high voltage is developed across the gate winding, which developed voltage is effectively blocked by the gate voltage source of the inhibit level. When the gate voltage source is at gate current permit level, minus 2 volts, there will be a voltage across the gate winding 22 producing a current in the winding which tends to change the flux condition of the core toward gate saturation. The minus 2 volts level is used to compensate for about one volt ohmic loss in the winding 22 and about one volt drop across the rectifier 39. The change in the gate voltage source from gate current permit level to gate current inhibit level is preferably made in two steps with the gate voltage source being at an intermediate level, here plus 22 volts, which will produce no current in the gate winding 22. This intermediate level is desirable because the back resistance of rectifier 39 may initially have a finite value when the gate current inhibit level voltage is applied thereto, which could result in a current in the gate winding and thereby a spurious reset. However, when for a short time there is zero potential across the rectifier, it attains its final substantially infinite back resistance.

In designing and constructing the amplifying circuit, the core, the windings and the voltage levels are selected so that the flux or volt-seconds per turn applied to the core during the gate half cycle will be less than the flux or volt-seconds per turn applied to the core in an opposite direction during the reset half cycle. For example, workable results are obtained when the volt-seconds per turn during the reset half cycle are at least 95% of the total flux change between opposite saturations and the volt-seconds per turn applied in the gate half cycle are 85% of the total flux change. The result is that when repetitive half cycles occur in each of which the core is alternately driven toward reset saturation and toward gate saturation, the core never attains full gate saturation. In the opposite case, that is when the gating flux applied to the core would be larger than the reset flux (or volt-seconds per turn), a series of cycles would, with each complete cycle, drive the core further toward gate saturation, until finally gate saturation would occur before the end of the gate period. Then the gate winding impedance would drop and an output signal would be generated where no such signal was intended. The reset volt-seconds per turn is preferably large enough to drive the core from gate saturation to reset saturation but may be smaller. However, it is essential that the volt-seconds per turn applied during the gate period be less than the volt-seconds per turn applied in the opposite sense during the reset period, and the volt-seconds per turn applied during a gate period must be less than that required to drive the core from reset saturation to gate saturation.

The sequence of operation of the amplifier circuit is as follows. Suppose that during the reset half cycle, a 1, plus 22 volts, is coupled to the input terminal 26. The core will be driven to reset saturation while the reset voltage source 23 is at the reset permit level. During the reset half cycle the gate voltage is plus 79 volts and the rectifier 39 is blocked and consequently no current flows in the gate winding 22. The output at the terminal 40 is a 1, plus 22 volts, because of the action of the voltage source 41 and the clamping diode 44. At the start of the next succeeding gate half cycle the gate voltage drops to minus 2 volts. The output clamped at 22 volts will tend to drive the core toward gate saturation, and current flows from the output through the gate winding 22 and rectifier 39 toward the gate voltage source 38, which is now at minus 2 volts. However, the initial impedance of the winding 22 is relatively high so that the current is small. The number of turns on the core is so chosen with respect to the other parameters (the clamp voltage of 22 volts and the duration of the gate half cycle) that saturation of the core is not achieved, its impedance therefore remains high, and consequently the current remains relatively small; i.e., the output 40 is not loaded enough to lower its potential below the voltage limited by clamping circuit 44, 43. Signals appearing at the input terminal 26 during the gate half cycle will have no effect on the core. If a 1 is again applied to the input terminal during the next reset half cycle, the core will be shifted to reset saturation again. The same sequence will follow during the next gate half cycle with the output again being a 1.

The situation is exactly the opposite when the core has not been reset and is at or near gate saturation. When the core is at gate saturation, the impedance of the gate winding 22 is low from the beginning of the gate half cycle and a considerable current begins to flow in the gate winding 22. The diode 44 is blocked and the only elements to be considered are now the voltage source 41, the ohmic resistance of winding 22, the diode 39 and the voltage source 38, now at minus 2 volts. As a result of this the output is very nearly at 0 volts.

Now suppose that a 0 signal, zero volts, is applied to the input terminal 26 during the reset half cycle. The flux condition of the core will remain unchanged during the reset half cycle and will be part way toward gate saturation. Then during the gate half cycle, initially the current is low but the voltage across the winding is high until gate saturation is achieved and this voltage drops from the clamping value (22 volts) to substantially zero at the beginning of the gate half cycle. Therefore, at a time well before the reset period of a cascaded stage of alternate phase begins.) During the reset half cycle, current in the gate winding is blocked by the diode 39, except during the time the gate voltage is at the level indicated by 52, during which time the reset winding is blocked (reset voltage at 36 volts) and no voltage is imposed on either winding. If the next succeeding input signal is a 0, the following output signal will be a 0, with the flux condition of the core remaining unchanged. If the next succeeding input signal is a 1, the core will be shifted to reset saturation and the operation will continue as previously described.

Because a 1 input signal produces a 1 output signal and a 0 input signal produces a 0 output signal, the circuit of FIG. 2 is known as a non-inverting amplifier. It is seen that the magnitudes and timing of the output signals are substantially independent of the magnitudes and timing of the input signals, thus providing an amplifier which does not pass on or magnify any departures from ideal characteristics existing in the input signals. Due to the fact that the input and output sides of the circuit function on alternate portions of a cycle, there is a time delay between receipt of an input signal and generation of an output signal. But it should be noted that the time of generation of the output signals is precisely controlled and is independent of time of arrival of input signals. This precise time control is of value in logical circuitry, where time may also be used as a dimension of the system. In the practice of the invention, the reset and gate voltage sources are ordinarily operated at a switching rate of two kilocycles per second and may be operated at much higher rates.

In determining the switching cycles of the reset and gate voltage sources, it is preferred to have the initiation of the reset permit level of the reset voltage source come after rather than simultaneous with the initiation of the gate current inhibit level of the gate voltage source. The relative timings of the two sources are shown in FIG. 3 where the reset voltage source is maintained at reset inhibit level for approximately the first one-third of the reset half cycle while the intermediate level, indicated by the line 52, of the gate voltage source lasts for only about one-fifth of the reset half cycle. The amplifier does not accept input signals during the gate half cycle. However, if input signals generated during the gate half cycle are delayed and arrive after initiation of the next following reset half cycle, the amplifier would not distinguish them from proper signals. However, the delay in switching to the reset permit level during the reset half cycle permits rejection of input signals which exist only during the first portion of the reset half cycle, which would ordinarily be the case with delayed signals. Also, spurious signals of short duration, such as switching transients occurring during switching of the gate voltage sources, are rejected by this delay in switching to the reset permit level.

Figure 4:
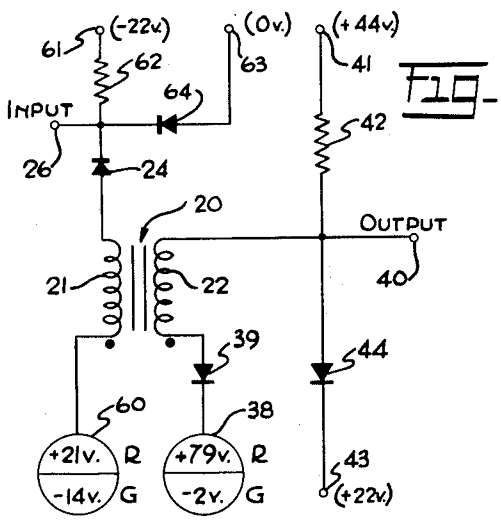
FIG. 4 is a schematic similar to that of FIG. 2 for an inverting amplifier.
Figure 5:
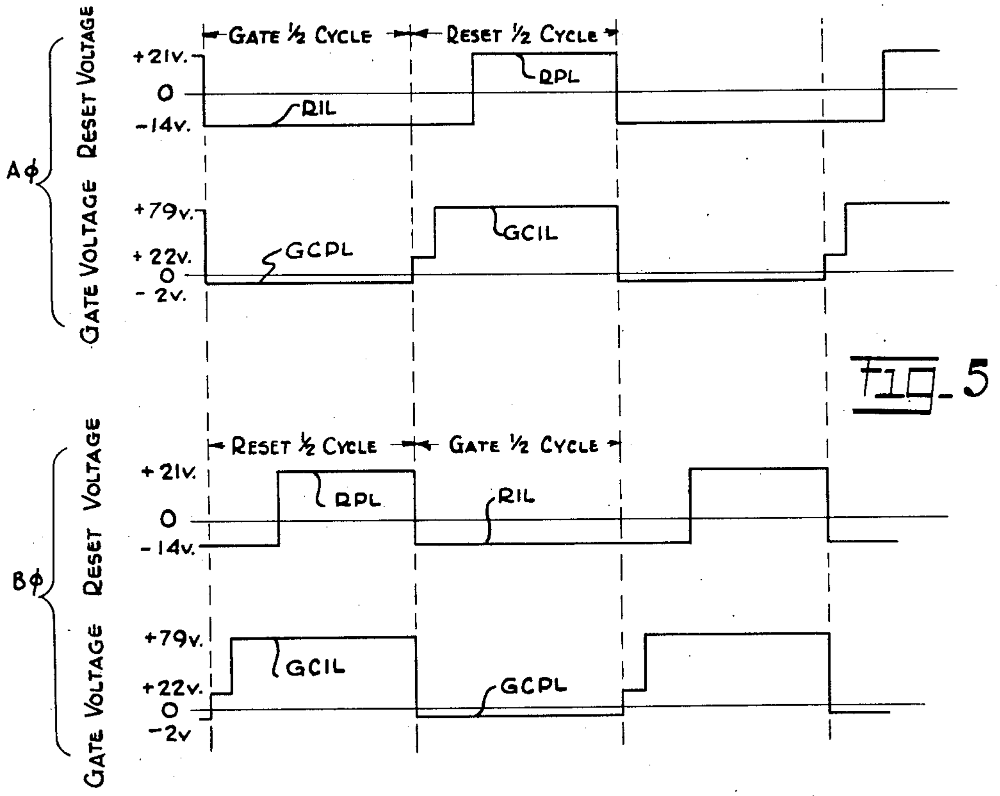
FIG. 5 shows voltage wave forms suitable for use with the amplifier of FIG. 4.

FIG. 4 shows an inverting amplifier and FIG. 5 shows wave forms of the voltage sources for use with the amplifier of FIG. 4. The amplifier of FIG. 4 operates on the same principle as the non-inverting amplifier of FIG. 2, with identical parts being identified by the same reference numerals. The input circuitry of the inverting amplifier is changed slightly so that a 1 input signal will produce a 0 output signal and a 0 input signal will produce a 1 output signal.

The gate winding 21 is connected in series with the rectifier 24 and a reset voltage source 60 to the input terminal 26. The purpose and mode of operation of the reset voltage source 60 are the same as that of the reset voltage source 23 of FIG. 2, except that the reset inhibit level, minues 14 volts, is less than the reset permit level, plus 21 volts. Also, a reference voltage source 61, minus 22 volts, is connected to the input terminal 26 through a resistor 62, as is a clamp circuit comprising a clamp voltage source 63, 0 volts, and a rectifier 64.

When the reset voltage source 60 is at the reset inhibit level, there will be no current in the reset winding 21, the clamp circuit maintaining the input terminal at substantially 0 volts while the reset inhibit level is considerably less than 0. When a 1, plus 22 volts, is applied to the input terminal while the reset voltage source is at the reset permit level, there will be no current in the reset winding 21 and, hence no change in flux condition of the core. However, when a 0 is connected to the input terminal while the reset voltage source is at the reset permit level, there will be a current in the reset winding with the core being changed to reset saturation. The operation of the gate winding and gate voltage sources is the same as in the non-inverting amplifier. Hence, the circuit of FIG. 4 behaves for a 1 as the circuit of FIG. 2 behaves for a 0 and vice versa.

Figure 7:
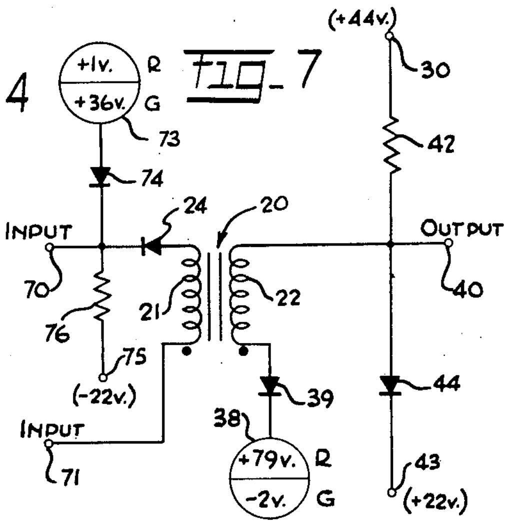
FIG. 7 is a schematic of an alternative embodiment of the amplifiers of FIGS. 2 and 4.

An alternative embodiment of the amplifier circuit of the invention is shown in FIG. 7, which circuit can be connected to operate either as an inverting amplifier or a non-inverting amplifier. The output side of this amplifier is the same as that of the amplifiers of FIGS. 2 and 4 and the gate and reset voltage sources are operated on the cycle shown in FIG. 3. The reset winding 21 and rectifier 24 are connected in series between a first input terminal 70 and a second input terminal 71. A reset voltage source 73, which is identical to the reset voltage source 23 of FIG. 2, is connected to the first input terminal 70 through a rectifier 74, which rectifier is polarized to permit current flow only from the reset voltage source to the input terminal. A reference voltage source 75, minus 22 volts, is also connected to the first input terminal through a resistor 76.

The amplifier of FIG. 7 may be operated as a non-inverting amplifier in the same manner as that of FIG. 2 by connecting the input signals to the second input terminal 71 with the first input terminal unconnected. The same circuit may be operated as an inverting amplifier in the same manner as the amplifier of FIG. 4 by connecting the input signal to the first input terminal 70 and connecting a 1, plus 22 volts to the second input terminal 71.

The amplifying circuits of the invention are often used in logical circuitry of data handling systems, digital computers and the like. In such logical circuitry, it is often desired to use the output of one amplifier either alone or in conjunction with other signals as the input to a succeeding amplifier. As the output of a particular amplifier is out of phase by one half cycle with its inputs, two serially connected amplifiers cannot be operated on the same switching cycle. Therefore, two sets of reset and gate voltages are provided with one set being shifted in time by one-half cycle relative to the other set. These two sets of voltages are ordinarily identified as A phase and B phase, the relations of the A and B phase voltages for non-inverting amplifiers being shown in FIG. 3 and for inverting amplifiers in FIG. 5.

Figure 6:
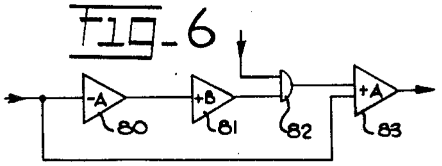
FIG. 6 is a schematic illustrating the connection of a plurality of the amplifiers of the invention in a system.

FIG. 6 illustrates how the amplifier circuits of the invention may be connected in a logical circuit or the like. The output of an inverting amplifier 80 operating on the A phase provides an input for a non-inverting amplifier 81 operating on the B phase. The output of the amplifier 81 together with another signal provides the inputs to an and gate 82. The input to the amplifier 81 also serves as an input to a non-inverting amplifier 83 operating on the A phase which has the output of the and gate 82 as a second input. This schematic is merely illustrative of the manner in which the amplifying circuits of the invention may be interconnected with succeeding amplifiers operating on alternate phases of the voltage sources.

Thus it is seen that the amplifying circuits of the invention provide output signals of predetermined levels and timing from input signals which may depart substantially from the nominal or ideal characteristics while rejecting spurious signals which may occur in the system.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a saturable core amplifier circuit for generating a single pulse output signal of relatively high energy and in relatively close adherence to a specific time scheme comprising alternating reset half cycles and gate half cycles in response to an input signal of relatively low energy and relatively loose adherence to said time scheme, the combination of: a saturable core having a substantially square hysteresis loop and in which the flux condition may be either a reset saturation, a gate saturation opposite thereto, or an intermediate condition; a reset winding on said core; first rectifier means connected in series with said reset winding for allowing current flow inducing flux change in said core only towards reset saturation; a reset voltage source sequentially assuming a reset permitting voltage level and a reset inhibiting voltage level; means for coupling an input having either of two signal voltages in circuit with said reset winding and said reset voltage source, with one of said signal voltages in combination with said reset permitting voltage providing volt-seconds per turn in said core of a magnitude greater than a particular value for producing a core flux change toward reset saturation; a gate winding on said core; second rectifier means connected in series with said gate winding for allowing current flow inducing flux change in said core only towards gate saturation; a gate voltage source coupled to one end of said gate winding and sequentially assuming a gate current permitting voltage level and a gate current inhibiting voltage level, said latter level occurring while said reset permitting voltage level exists, with the volt-seconds per turn applied to the core through the gate winding for producing a core flux change toward gate saturation being less than said particular value; and an output circuit coupled to the other end of said gate winding and providing an output voltage of a first value, which output voltage is variable to a second value by said gate voltage only when said core is at gate saturation and said gate voltage is at said gate current permitting voltage level, such that the magnitude of signal voltage during said reset permitting voltage level of said reset voltage source controls the magnitude of said output voltage during said gate current permitting voltage level of said gate voltage source.

2. In a saturable core amplifier circuit for generating a single pulse output signal of relatively high energy and in relatively close adherence to a specific time scheme comprising alternating reset half cycles and gate half cycles in response to an input signal of relatively low energy and relatively loose adherence to said time scheme, the combination of: a saturable core having a substantially square hysteresis loop and in which the flux condition may be eitiher a reset saturation, a gate saturation opposite thereto, or an intermediate condition; a reset winding on said core; first rectifier means connected in series wtih said reset winding for allowing current flow inducing flux change in said core only towards reset saturation; a reset voltage source sequentially assuming a reset permitting voltage level and a reset inhibiting voltage level; means for coupling an input having either of two signal voltages in circuit with said reset winding and said reset voltage source, with one of said signal voltages in combination with said reset permitting voltage providing volt-seconds per turn in said core of a magnitude greater than a particular value for producing a core flux change toward reset saturation; second rectifier means connected in series with said gate winding for allowing current flow inducing flux change in said core only towards gate saturation; a gate voltage source coupled to one end of said gate winding and sequentially assuming a gate current permitting voltage level and a gate current inhibiting voltage level, said latter level occurring while said reset permitting voltage level exists; an output voltage source clamped at a first output voltage level; and means coupling said gate winding in shunt with said output voltage source whereby the low impedance of said winding at gate saturation changes said first output voltage level to a second output voltage level while the high impedance of said winding at nongate saturation does not affect said first output voltage level, with the combination of said output voltage source and said gate voltage source at gate current permitting level providing volt-seconds per turn in said gate winding less than said particular value.

3. In a saturable core amplifier circuit for generating a single pulse output signal of relatively high energy and in relatively close adherence to a specific time scheme comprising alteranting reset half cycles and gate half cycles in response to an input signal of relatively low energy and relatively loose adherence to said time scheme, the combination of: a saturable core having a substantially square hysteresis loop and in which the flux condition may be either a reset saturation, a gate saturation opposite thereto, or an intermediate condition; a reset winding on said core; first rectifier means connected in series with said reset winding for allowing current flow inducing flux change in said core only towards reset saturation; a reset voltage source sequentially assuming a reset permitting voltage level and a reset inhibiting voltage level; means for coupling an input having either of two signal voltages in circuit with said reset winding and said reset voltage source, with one of said signal voltages in combination with said reset permitting voltage providing volt-seconds per turn in said core of a magnitude greater than a particular value for producing a core flux change toward reset saturation; a gate winding on said core; second rectifier means connected in series with said gate winding for allowing current flow inducing flux change in said core only towards gate saturation; a gate voltage source coupled to one end of said gate winding and sequentially assuming a gate current permitting voltage level and a gate current inhibiting voltage level, said latter level occurring while said reset permitting voltage level exists, with the volt-seconds per turn applied to the core through the gate winding for producing a core flux change toward gate saturation being less than said particular value; and an output circuit coupled to the other end of said gate winding and providing an output voltage of a first value, which output voltage is variable to a second value by said gate voltage only when said core is at gate saturation and said gate voltage is at said gate current permitting voltage level, such that the magnitude of signal voltage during said reset permitting voltage level of said reset voltage source controls the magnitude of said output voltage during said gate current permitting voltage level of said gate voltage source, with said reset permitting voltage level commencing after initiation of a reset half cycle and ending at the start of the next succeeding gate cycle so that said circuit is nonresponsive to signal voltages existing only during a first portion of said reset half cycle.

4. In a saturable core amplifier circuit for generating a single pulse output signal of relatively high energy and in relatively close adherence to a specific time scheme comprising alternating reset half cycles and gate half cycles in response to an input signal of relatively low energy and relatively loose adherence to said time scheme, the combination of: a saturable core having a substantially square hysteresis loop and in which the flux condition may be either a reset saturation, a gate saturation opposite thereto, or an intermediate condition; a reset winding on said core; first rectifier means connected in series with said reset winding for allowing current flow inducing flux change in said core only towards reset saturation; a reset voltage source sequentially assuming a reset permitting voltage level and a reset inhibiting voltage level; means for coupling an input having either of two signal voltages in circuit with said reset winding and said reset voltage source, with one of said signal voltages in combination with said reset permitting voltage providing volt-seconds per turn in said core of a magnitude greater than a particular value for producing a core flux change toward reset saturation; a gate winding on said core; second rectifier means connected in series with said gate winding for allowing current flow inducing flux change in said core only towards gate saturation; a gate voltage source coupled to one end of said gate winding and sequentially assuming a gate current permitting voltage level and a gate current inhibiting voltage level, said latter level occurring while said reset permitting voltage level exists, with the volt-seconds per turn applied to the core through the gate winding for producing a core flux change toward gate saturation being less than said particular value; and an output circuit coupled to the other end of said gate winding and providing an output voltage of a first value, which output voltage is variable to a second value by said gate voltage only when said core is at gate saturation and said gate voltage is at said gate current permitting voltage level, such that the magnitude of signal voltage during said reset permitting voltage level of said reset voltage source controls the magnitude of said output voltage during said gate current permitting voltage level of said gate voltage source, with said gate voltage source changing from said gate current permitting level to said gate current inhibiting level during said reset half cycle prior to the change of said reset voltage source from said reset inhibiting level to said reset permitting level, and with said gate voltage source assuming and remaining at an intermediate level between said permitting and inhibiting levels for an interval sufficient to permit said second rectifier means to build its back resistance to a maximum, which intermediate level is of a value to provide substantially zero magnetomotive force to said core.

5. An amplifier circuit as defined in claim 1 in which the maximum volt-seconds per turn applied to the core during a gate half cycle by means of said gate winding are less than the volt-seconds per turn that are necessary to induce a flux change therein from reset saturation to gate saturation, and in which the volt-seconds per turn applied to the core during a reset half cycle by means of said reset winding may be more than the volt-seconds per turn applied to the core by means of said gate winding during said gate half cycle.

6. In a saturable core amplifier for generating an output signal in response to an input signal prior in time thereto and having an input winding and an output winding on a core, the combination of: a reset source and a gate source each having a voltage output which varies over a repetitive time cycle having a first part, a second part and an interval between a second part and a subsequent first part; means for coupling said reset voltage source to said input winding for generating responsiveness in said core to input signals during said first part of said time cycle and nonresponsiveness during said second part and said interval; and means for coupling said gate voltage source to said output winding for permitting the generation of output signals during said second part of said time cycle and not during said interval and said first part.

7. In an amplifier circuit, the combination of: a saturable core in which the flux condition may be reset saturation, gate saturation, or an intermediate state; a reset winding on said core; a gate winding on said core; a first rectifier connected in series with said reset winding to permit current inducing flux change in said core only towards reset saturation; a second rectifier connected in series with said gate winding to permit current inducing flux change in said core only towards gate saturation; a reset voltage source cyclically providing a reset permit voltage and a reset inhibit voltage; a gate voltage source cyclically providing a gate current permit voltage and a gate current inhibit voltage, with said reset permit voltage existing concurrently with said gate current inhibit voltage; an output voltage source generating an output voltage at an output terminal; circuit means connecting said gate voltage source to said gate winding with the latter shunting said output voltage such that a high impedance state of said gate winding produces a first output voltage and a low impedance state produces a second output voltage; and circuit means for connecting an input voltage source and said reset voltage source to said reset winding, with an input voltage and said reset permit voltage being capable of producing volt-seconds per turn in said reset winding of a magnitude to change the flux condition of said core from gate saturation substantially to reset saturation, and with an input signal at said input voltage source occurring with said reset permit voltage producing a single output signal concurrent with the next gate current permit voltage with the timing of the output signal independent of the time of occurrence of the input signal.

8. In an amplifier circuit, the combination of: a saturable core in which the flux condition may be reset saturation, gate saturation, or an intermediate state; a reset winding on said core; a gate winding on said core; a first rectifier connected in series with said reset winding to permit current inducing flux change in said core only towards reset saturation; a second rectifier connected in series with said gate winding to permit current inducing flux change in said core only towards gate saturation; a reset voltage source cyclically providing a reset permit voltage and a reset inhibit voltage; a gate voltage source cyclically providing a gate current permit voltage and a gate current inhibit voltage, with said reset permit voltage existing concurrently with said gate current inhibit voltage; an output voltage source generating an output voltage at an output terminal, said output voltage source including a voltage clamp determining a first output voltage; circuit means connecting said gate voltage source, said second rectifier and said gate winding to said output terminal in series, with the combination of said gate current permit voltage, said gate winding and said output voltage source providing a flux change in said core less than a particular value and less than that which will change said core from said reset saturation to said gate saturation condition, with said gate winding shunting said output voltage to produce a second output voltage when said core is at gate saturation; and circuit means for connecting an input voltage source and said reset voltage source to said reset winding, with an input voltage and said reset permit voltage being capable of producing volt-seconds per turn in said reset winding to change the flux condition of said core from gate saturation toward reset saturation more than said particular value.

9. In an amplifier circuit, the combination of: a saturable core in which the flux condition may be reset saturation, gate saturation, or an intermediate state; a reset winding on said core; a gate winding on said core; a first rectifier connected in series with said reset winding to permit current inducing flux change in said core only towards reset saturation; a second rectifier connected in series with said gate winding to permit current inducing flux change in said core only towards gate saturation; a reset voltage source cyclically providing a reset permit voltage and a reset inhibit voltage; a gate voltage source cyclically providing a gate current permit voltage and a gate current inhibit voltage, with said gate current inhibit voltage beginning before and existing during the existence of said reset permit voltage, and with said gate voltage source changing from said gate urrent permit voltage to said gate current inhibit voltage in at least two discrete steps wherein one step provides substantially no flux in said core; an output voltage source generating an output voltage at an output terminal, said output voltage source including a voltage clamp determining a first output voltage; circuit means connecting said gate voltage source, said second rectifier and said gate winding to said output terminal in series, with the combination of said gate current permit voltage, said gate winding and said output voltage source providing a flux change in said core less than a particular value and less than that which will change said core from said reset saturation to said gate saturation condition, with said gate winding shunting said output voltage to produce a second output voltage when said core is at gate saturation; and circuit means for connecting an input voltage source and said reset voltage source to said reset winding, with an input voltage and said reset permit voltage being capable of producing volt-seconds per turn in said reset winding to change the flux condition of said core from gate saturation toward reset saturation more than said particular value, and with another input voltage and said reset permit voltage not capable of changing the flux condition of said core, and with any input voltage and said reset inhibit voltage not capable of changing the flux condition of said core.

10. In an amplifier circuit, the combination of: a saturable core in which the flux condition may be reset saturation, gate saturation, or an intermediate state; a reset winding on said core; a gate winding on said core; a first rectifier connected in series with said reset winding to permit current inducing flux change in said core only toward reset saturation; a second rectifier connected in series with said gate winding to permit current inducing flux change in said core only towards gate saturation; a reset voltage source cyclically providing a reset permit voltage and a reset inhibit voltage; a gate voltage source cyclically providing a gate current permit voltage and a gate current inhibit voltage, with said gate current inhibit voltage beginning before and existing during the existence of said reset permit voltage; an output voltage source generating an output voltage at an output terminal; circuit means connecting said gate voltage source to said gate winding with the latter shunting said output voltage such that a high impedance state of said gate winding produces a first output voltage and a low impedance state produces a second output voltage; and circuit means for connecting an input voltage source and said reset voltage source to said reset winding, with the combination of said reset permit voltage, said reset winding and an input voltage producing a flux change in said core sufficient to change said core from gate saturation substantially to reset saturation, and with said reset inhibit voltage blocking currents in said reset winding for any input voltage.

11. In an amplifier circuit, the combination of: a saturable core in which the flux condition may be reset saturation, gate saturation, or an intermediate state; a reset winding on said core; a gate winding on said core; a first rectifier connected in series with said reset winding to permit current inducinng flux change in said core only towards reset saturation; a second rectifier connected in series with said gate winding to permit current inducing flux change in said core only towards gate saturation; a reset voltage source cyclically providing a reset permit voltage and a reset inhibit voltage; a gate voltage source cyclically providing a gate current permit voltage and a gate current inhibit voltage, with said gate current inhibit voltage beginning before and existing during the existence of said reset permit voltage; an output terminal; circuit means connecting said gate voltage source, said second rectifier and said gate winding to said output terminal in series, with said winding between said source and terminal; an output voltage source connected to said output terminal; a voltage clamp connected to said output terminal for maintaining one limit on the voltage at said terminal, with said gate current inhibit voltage blocking current in said gate winding and said gate current permit voltage providing volt-seconds per turn in said gate winding of a magnitude less than a particular value and less than that necessary to shift said core from reset saturation to gate saturation, said gate winding presenting a relatively high impedance to said output terminal except when said core is at gate saturation; an input terminal; and circuit means connecting said reset voltage source, said first rectifier and said reset winding to said input terminal in series, with said winding between said source and terminal, said reset inhibit voltage blocking current in said reset winding for any input voltage not exceeding a maximum, and said reset permit voltage, in combination with an input voltage exceeding a predetermined magnitude less than said maximum, providing volt-seconds per turn in said reset winding of a magnitude greater than said particular value for shifting said core from gate saturation toward reset saturation.

12. In an amplifier circuit, the combination of: a saturable core in which the flux condition may be reset saturation, gate saturation, or an intermediate state; a reset winding of said core; a gate winding on said core; a first rectifier connected in series with said reset winding to permit current inducing flux change in said core only towards reset saturation; a second rectifier connected in series with said gate winding to permit current inducing flux change in said core only towards gate saturation; a reset voltage source cyclically providing a reset permit voltage and a reset inhibit voltage; a gate voltage source cyclically providing a gate current permit voltage and a gate current inhibit voltage, with said gate current inhibit voltage beginning before and existing during the existence of said reset permit voltage; an output terminal; circuit means connecting said gate voltage source, said second rectifier and said gate winding to said output terminal in series, with said winding between said source and terminal; an output voltage source connected to said output terminal; a first voltage clamp connected to said output terminal for maintaining one limit on the voltage at said terminal, with said gate current inhibit voltage blocking current in said gate winding and said gate current permit voltage providing volt-seconds per turn in said gate winding of a magnitude less than a particular value and less than that necessary to shift said core from reset saturation to gate saturation, said gate winding presenting a relatively high impedance to said output terminal except when said core is at gate saturation; an input terminal; circuit means connecting said reset voltage source, said first rectifier and said reset winding to said input terminal in series, with said winding between said source and terminal; a reference voltage source connected to said input terminal; and a second voltage clamp connected to said input terminal for maintaining one limit on the voltage at said terminal, with said reset inhibit voltage blocking current in said reset winding for any input voltage not exceeding a maximum, and said reset permit voltage, in combination with an input voltage not exceeding a predetermined magnitude, providing volt-seconds per turn in said reset winding of a magnitude greater than said particular value for shifting said core from gate saturation toward reset saturation.

13. In an amplifier circuit, the combination of: a saturable core in which the flux condition may be reset saturation, gate saturation, or an intermediate state; a reset winding on said core; a gate winding on said core; a first rectifier connected in series with said reset winding to permit current inducing flux change in said core only towards reset saturation; a second rectifier connected in series with said gate winding to permit current inducing flux change in said core only towards gate saturation; a reset voltage source cyclically providing a reset permit voltage and a reset inhibit voltage; a gate voltage source cyclically providing a gate current permit voltage and a gate current inhibit voltage, with said gate current inhibit voltage beginning before and existing during the existence of said reset permit voltage; an output terminal; circuit means connecting said gate voltage source, said second rectifier and said gate winding to said output terminal in series, with said winding between said source and terminal; and output voltage source connected to said output terminal; a voltage clamp connected to said output terminal for maintaining one limit on the voltage at said terminal, with said gate current inhibit voltage blocking current in said gate winding and said gate current permit voltage providing volt-seconds per turn in said gate winding of a magnitude less than that necessary to shift said core from reset saturation to gate saturation, said gate winding presenting a relatively high impedance to said output terminal except when said core is at gate saturation; a first input terminal; a second input terminal; circuit means connecting said reset winding and said first rectifier in series between said input terminals; a reference voltage source connected to said first input terminal; and a third rectifier connected between said reset voltage source and said first input terminal so as to permit current flow only from said source to said terminal, said reset inhibit voltage blocking current in said reset winding for any input voltage at either of said input terminals not exceeding a predetermined maximum.

References Cited in the file of this patent

UNITED STATES PATENTS

| | | |
|---|---|---|
| 2,792,506 | Torrey | May 14, 1957 |
| 2,911,543 | Steagall | Nov. 3, 1959 |

UNITED STATES PATENT OFFICE
CERTIFICATE OF CORRECTION

Patent No. 3,039,008 June 12, 1962

J. Herbert Brown

It is hereby certified that error appears in the above numbered patent requiring correction and that the said Letters Patent should read as corrected below.

Column 6, line 14, before "Therefore" insert an opening parenthesis; column 7, line 9, for "minues" read -- minus --; line 59, for "inputs" read -- input --; column 12, line 4, for "urrent" read -- current --; line 63, for "inducinng" read -- inducing --; column 13, line 26, for "of" read -- on --.

Signed and sealed this 9th day of October 1962.

(SEAL)
Attest:

ERNEST W. SWIDER
Attesting Officer

DAVID L. LADD
Commissioner of Patents